United States Patent [19]
Whitman, III

[11] Patent Number: 5,151,753
[45] Date of Patent: Sep. 29, 1992

[54] NON-PARALLAX OPTICAL SIGHTING INSTRUMENT

[76] Inventor: Hobart A. Whitman, III, 149 Westwood Rd., Asheville, N.C. 28804

[21] Appl. No.: 595,182

[22] Filed: Oct. 10, 1990

[51] Int. Cl.$^5$ .................. G01C 1/06; G01C 9/32; G01C 17/08; B23B 45/14
[52] U.S. Cl. ..................... 356/142; 33/272; 33/334; 33/348; 33/364; 356/247
[58] Field of Search ............. 356/147, 131-140, 356/142, 143, 251-255, 247; 33/272, 273, 275, 348, 364, 334; 434/38, 40, 44; 359/630

[56] References Cited

U.S. PATENT DOCUMENTS

| | | | |
|---|---|---|---|
| 811,777 | 2/1906 | Konig | 356/142 X |
| 1,043,562 | 11/1912 | Bedell . | |
| 1,195,300 | 8/1916 | Wagner . | |
| 1,294,710 | 2/1919 | Roland . | |
| 1,376,727 | 5/1921 | Pentz et al. . | |
| 1,705,146 | 3/1929 | Willson | 33/348 X |
| 1,867,812 | 7/1932 | Dodd et al. . | |
| 2,022,516 | 11/1935 | Owen | 356/142 |
| 2,911,879 | 11/1959 | Giwosky . | |
| 2,970,510 | 2/1961 | Mixner . | |
| 3,084,443 | 4/1963 | Kaatz et al. . | |
| 3,128,562 | 4/1964 | Yusa . | |
| 3,423,051 | 1/1969 | Jakab | 33/275 G X |
| 3,527,523 | 9/1970 | Travis | 350/174 X |
| 3,813,792 | 6/1974 | Jarvenpaa . | |
| 4,402,140 | 9/1983 | Nagae | 33/272 |
| 4,763,419 | 8/1988 | Whitman | 33/272 |

FOREIGN PATENT DOCUMENTS

| | | | |
|---|---|---|---|
| 910595 | 5/1954 | Fed. Rep. of Germany | 33/272 |
| 752862 | 3/1955 | United Kingdom | 33/348 |
| 1293808 | 10/1972 | United Kingdom . | |
| 1510467 | 5/1978 | United Kingdom . | |

OTHER PUBLICATIONS

Eugene Hecht, "Theory and Problems of Optics", Schaum's Outline Series, MacGraw-Hill Book Company, Chapter 4, Geometrical Optics, pp. 51–55 (1975).
Warren J. Smith, "Modern Optical Engineering—The Design of Optical Systems", McGraw-Hill Book Company, pp. 93–95; 212, 213 (1966).
Sales Brochurer, Oriel Optics & Filters, vol. III, pp. 90, 91 (250 Long Beach Blvd., Stratford, Ct.).
Walter G. Driscoll et al., Editor, "Handbook of Optics", Optical Society of America, pp. 2-52 through 2-54 (1978).

Primary Examiner—F. L. Evans
Assistant Examiner—K. P. Hantis
Attorney, Agent, or Firm—Steven C. Schnedler

[57] ABSTRACT

An optical sighting instrument having a main optical path including an objective lens, an eyepiece lens and a beamsplitter for combining or superimposing images. At least three image planes are defined with reference to the main optical path and the beamsplitter, and at least one of the three image planes is optically superimposed with the other two by the combining effect of the beamsplitter. Movable indicia elements are positioned in two of the image planes, and a fixed indicia element is positioned in the third one of the image planes. As a result, images of all three of the indicia elements are superimposed for viewing through the eyepiece lens, and the image of the fixed indicia element serves as a sighting reference. Illustratively, one of the movable indicia elements is a magnetic compass, the other of the movable indicia elements is a magnetic declination adjustment, and the fixed indicia element is a cross-hair sight. A pair of polarizers adjustable in relative orientation may be provided and positioned for varying the intensity either of the image of one of the indicia elements or the intensity of the object image. A lamp may be included for illuminating at least one of the indicia elements through the beamsplitter, while the beamsplitter prevents its direct light from reaching the eyepiece lens. The magnetic compass may be in the form of a sphere, and a field-flattener lens is positioned in front of the compass sphere so that the surface appears flat.

17 Claims, 9 Drawing Sheets

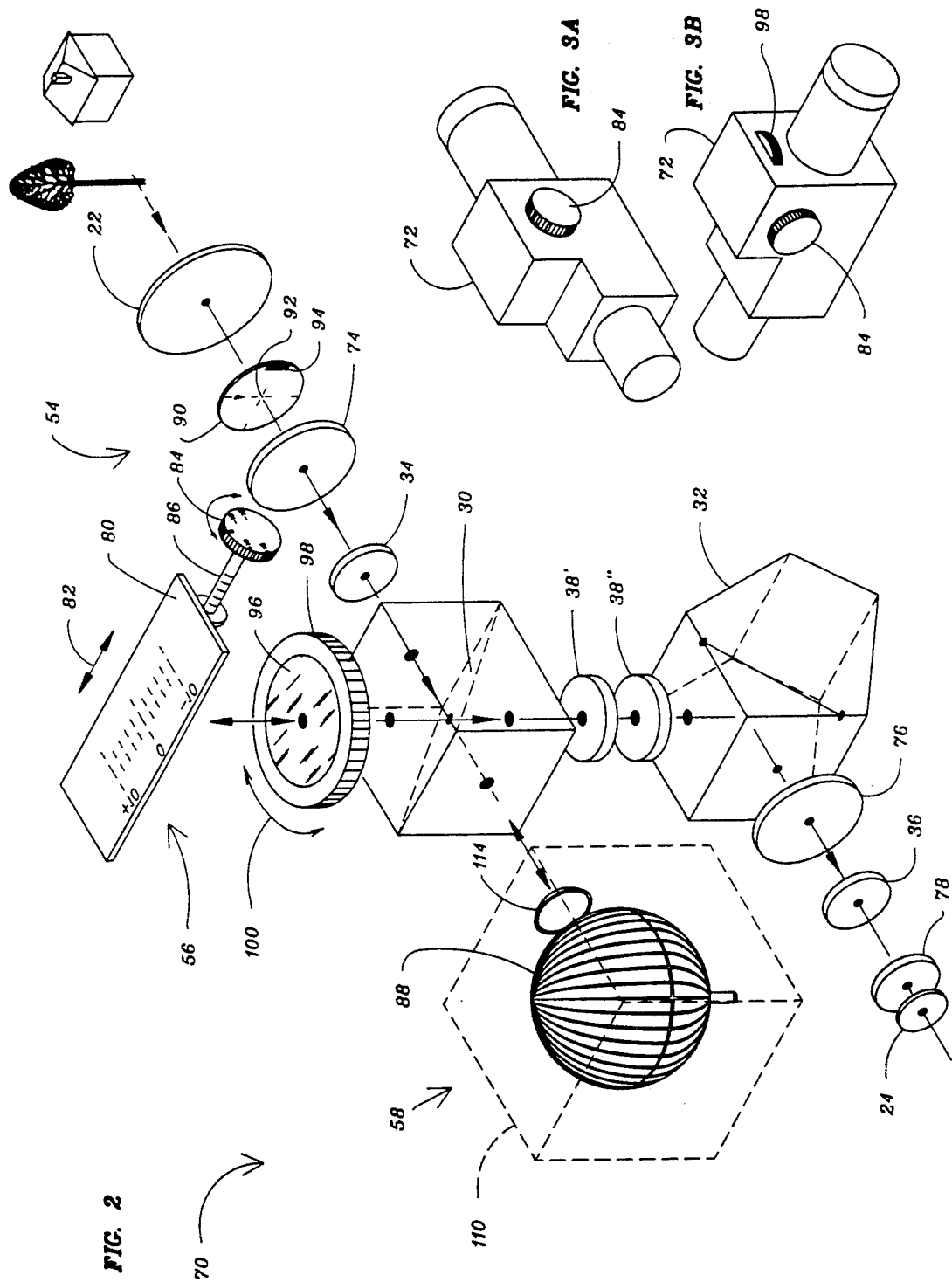

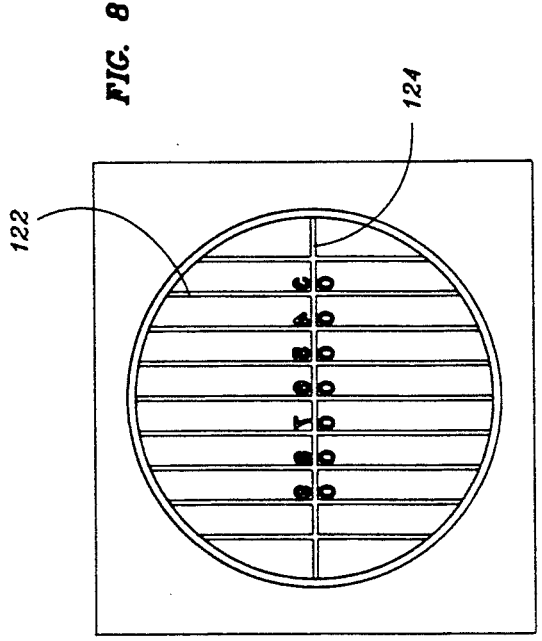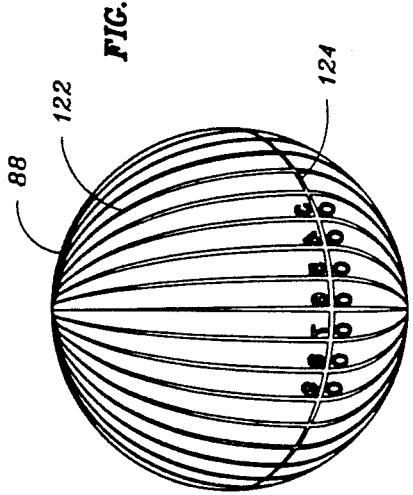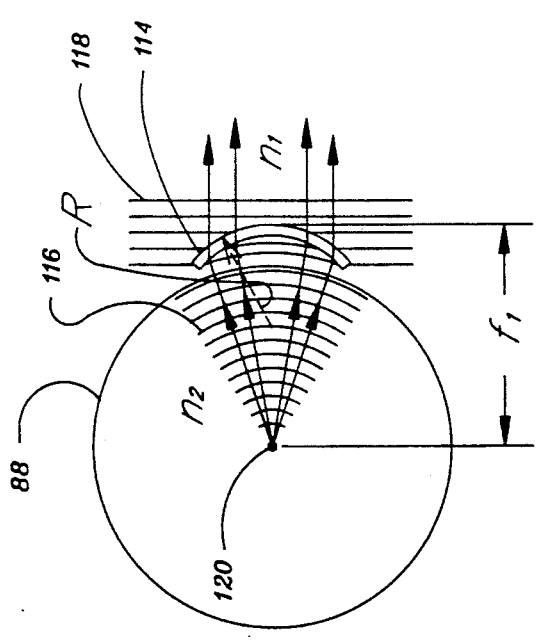

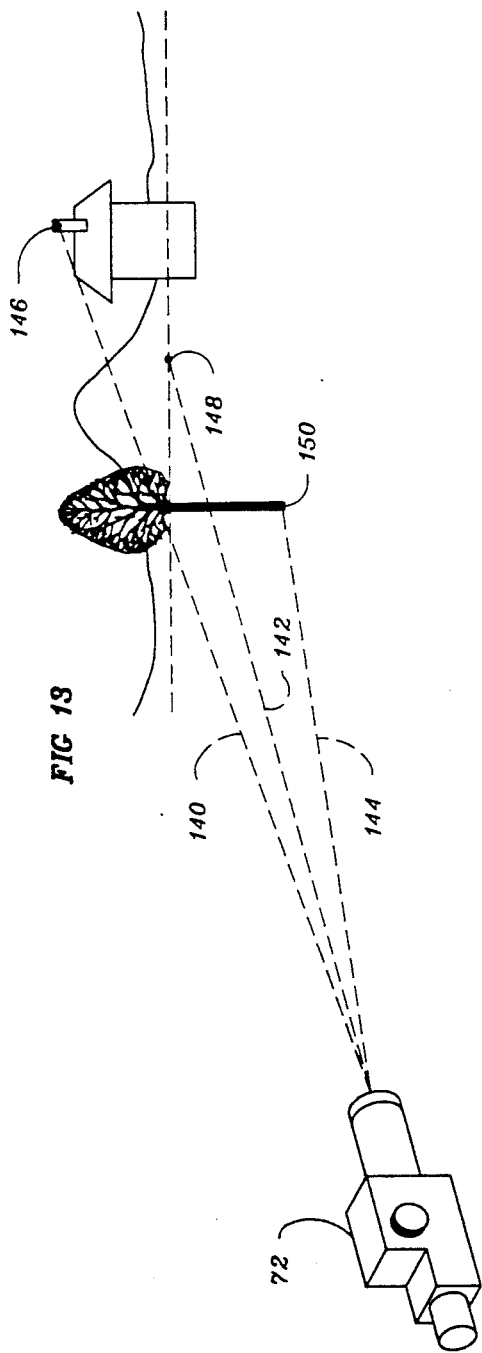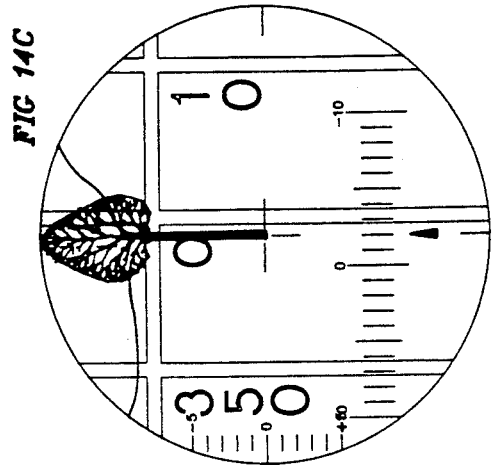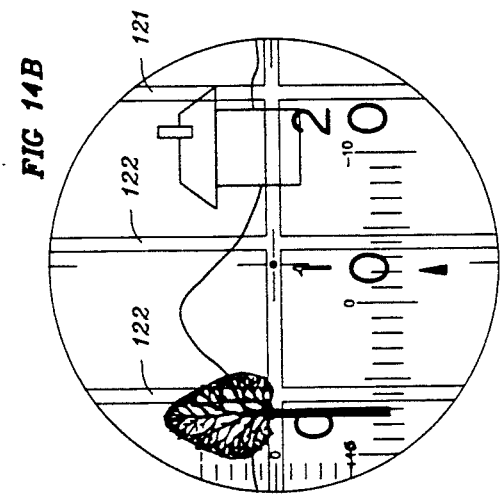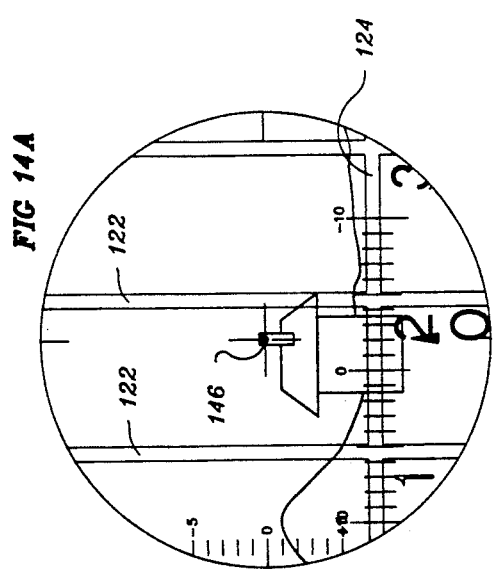

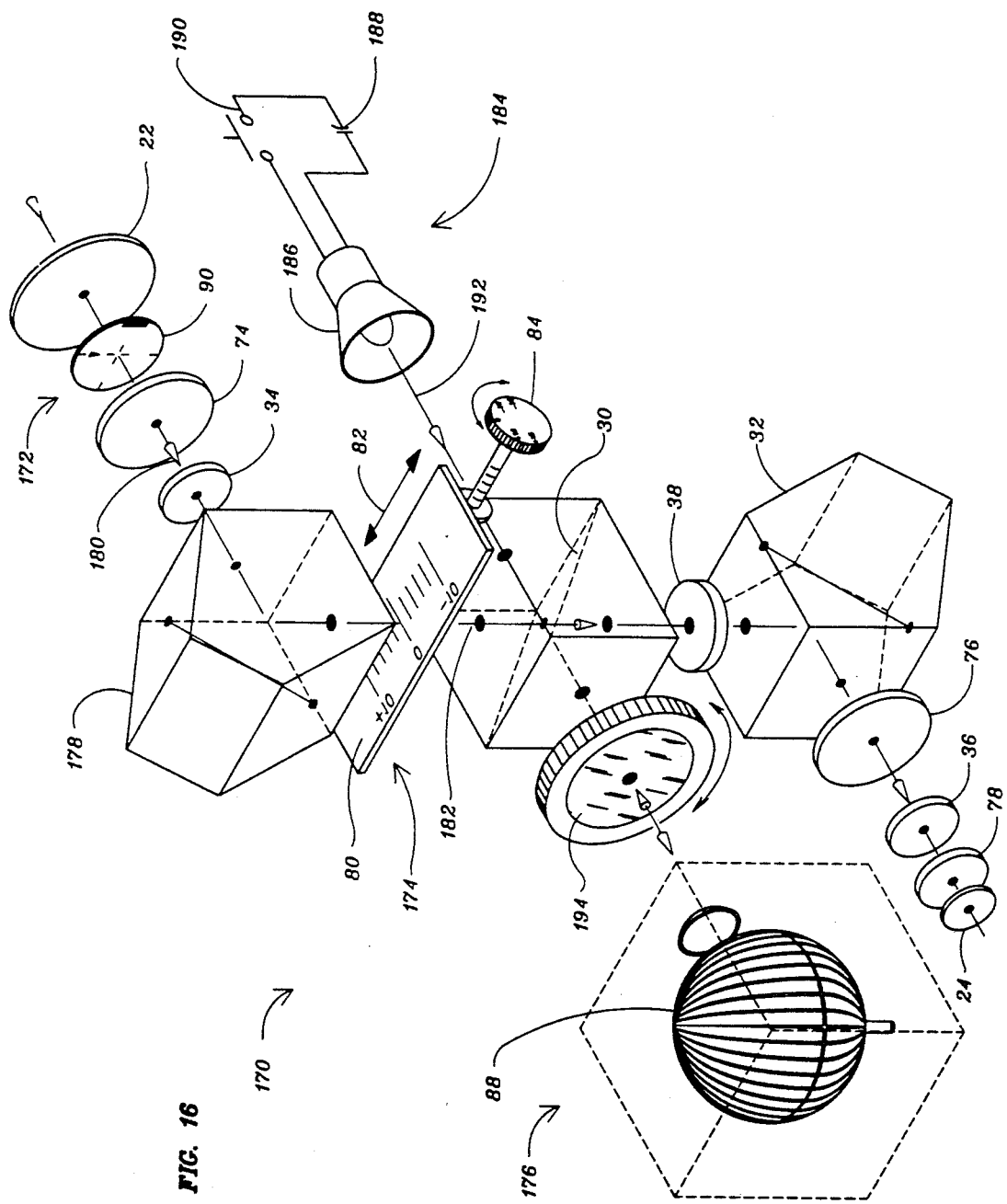

NON-PARALLAX OPTICAL SIGHTING INSTRUMENT

BACKGROUND OF THE INVENTION

This is an improvement to the invention of my U.S. Pat. No. 4,763,419, issued Aug. 16, 1988, entitled "Optical Viewing System", the entire disclosure of which is hereby expressly incorporated by reference.

The present invention relates generally to optical sighting instruments such as telescopic instruments incorporating a compass for simultaneously viewing and determining the direction of an object and, more particularly, to such instruments which eliminate parallax and further which automatically compensate for magnetic declination or variation such that directions referenced to true north may be determined employing a compass which seeks magnetic north.

As is known, parallax occurs in reading instruments such as compasses because a compass needle, for example, does not lie directly against its scale. Unless the observer's eye is aligned correctly with the needle and the scale, an apparent reading will occur which is to one side or the other of the actual reading.

In the instrument of my U.S. Pat. No. 4,763,419, a beamsplitter is employed for combining or superimposing an image of a moving compass scale with an image of a distant object viewed through the instrument, such that the two images may be viewed simultaneously and the direction of a sighted object determined while viewing through the instrument.

In most geographical locations, the direction of magnetic north does not coincide with the direction of true north. Stated alternatively, there is an angle between the local magnetic meridian and the geographic meridian, which is known as magnetic declination or magnetic variation. Maps and charts are available which indicate this phenomenon as easterly or westerly magnetic declination or variation. Magnetic declination is expressed in degrees. To convert or correct a magnetic compass reading to a reading referenced to true north rather than magnetic north, the local magnetic declination is either added or subtracted from the magnetic compass reading.

To facilitate correction for magnetic declination, the instrument of my U.S. Pat. No. 4,763,419 includes a movable sighting indicia which may be moved to the left or the right in the field of view through the instrument to adjust for local magnetic declination. The beamsplitter optics also combines or superimposes an image of the movable sighting reference with images of the compass scale and the object so that all three are viewed simultaneously. Such use of a beamsplitter to superimpose images effectively eliminates parallax. In the use of the instrument of my U.S. Pat. No. 4,763,419, a distant object being viewed or sighted is aligned with the movable sighting reference or cross hair, and the compass reading in degrees is read where the image of the cross hair intersects the compass scale, as is illustrated in FIG. 4 of U.S. Pat. No. 4,763,419.

Although it is an effective and useful instrument, the instrument of my U.S. Pat. No. 4,763,419 is subject to improvement. For example, it would be desirable to provide a means for compensating for magnetic declination, while allowing a cross hair or other indicia used to sight a distant object to be centered within the field of view at all times. It would also be desirable to provide an instrument suitable for night use. There are other areas of improvement, as will be apparent from the description hereinbelow.

SUMMARY OF THE INVENTION

Accordingly, it is an object of the invention to provide an improved optical sighting instrument which eliminates parallax.

It is another object of the invention to provide an optical sighting instrument including a magnetic compass and an improved means for adjusting for magnetic declination or variation.

It is another object of the invention to provide such an instrument including an improved means for reading a compass including a surface having a spherical curvature.

It is yet another object of the invention to provide such an instrument which may be employed for nighttime use.

It is yet another object of the invention to provide such an instrument wherein the relative intensities of the various superimposed indicia and object images may be adjusted to facilitate use and accurate reading under various conditions.

Briefly stated, in accordance with the invention there is provided an optical sighting instrument including a main optical path with an objective lens, an eyepiece lens, and a beamsplitter positioned within the main optical path. At least three image planes are defined with reference to the main optical path and the beamsplitter, and at least one of the image planes is optically superimposed with the others of the image planes by means of the combining effect of the beamsplitter. Movable indicia elements are positioned in two of the image planes, and a fixed indicia element is positioned in the third of the image planes. As a result, images of all three of the indicia elements are superimposed for viewing through the eyepiece lens, and the image of the fixed indicia element serves as a sighting reference for sighting a distant object viewed through the instrument. Parallax is non-existent since all image planes are optically unaltered relative to each other even as images are split and recombined, and the image planes share a common optical axis.

In one embodiment, one of the movable indicia elements is a magnetic compass, the other of the movable indicia elements is a magnetic declination adjustment, and the fixed indicia element is a cross-hair sight.

Within this overall context of three indicia images superimposed with an object image, a variety of specific arrangements and indicia characteristics may be employed in accordance with the invention. In one embodiment, at least one of the indicia elements comprises a reflecting surface with non-reflecting indicia thereon, and the main optical path is deviated 180° by reflection from the reflecting surface of the indicia element.

At least one of the indicia elements may comprise a transparent or translucent substrate supporting visible indicia thereon, with the main optical path passing through the indicia elements. Alternatively, at least one of the indicia elements may comprise a non-reflecting surface with reflecting indicia thereon. In one embodiment, two of the indicia elements comprise reflecting surfaces, and the main optical path is separated by the beamsplitter into two portions which are each then deviated 180° by reflection from the two indicia elements, and then recombined by the beamsplitter.

In accordance with another aspect of the invention, there may be provided a means for illuminating at least one of the indicia elements, for example the magnetic compass, through the beamsplitter, the arrangement being such that illumination light is not directed through the eyepiece lens, and thus the user is not blinded. However, the illumination light may be directed by the beamsplitter out through the objective lens, and under some conditions may be used to provide a targeting spot at night on an object whose position is to be referenced.

In order to vary the relative intensities of the various indicia and object images, a pair of polarizers adjustable in relative orientation are provided and positioned for varying the intensity either of the image of one of the indicia elements or the intensity of the object image viewed through the main optical path. Preferably, the beamsplitter itself comprises one of the polarizers.

Conveniently, the magnetic compass comprises a sphere supported within a liquid. The spherical surface of such a compass, particularly when it is in part reflecting, introduces a slight optical distortion. Accordingly, in accordance with another aspect of the invention, a field-flattener lens is positioned in front of the magnetic compass surface so as to make the surface having a spherical curvature appear as a flat surface. The liquid in the chamber within which the magnetic compass is supported has a particular index of refraction, and the field-flattener lens is made or a material having a substantially identical index of refraction.

BRIEF DESCRIPTION OF THE DRAWINGS

While the novel features of the invention are set forth with particularity in the appended claims, the invention, both as to organization and content will be better understood and appreciated, along with other objects and features thereof, from the following detailed description taken in conjunction with the drawings, in which:

FIG. 2 is a diagram of an optical system embodying one form of optical sighting instrument in accordance with the invention, particularly suitable for daytime use;

FIGS. 3A and 3B are two views of a housing suitable for the optical sighting instrument of the invention;

FIG. 6 schematically depicts the optics of the field-flattener lens used in combination with the spherical compass element;

FIG. 7 is a three-dimensional view of the spherical compass element depicting indicia thereon;

FIG. 8 is a view of the spherical compass element as viewed through the field-flattener lens;

FIG. 13 depicts the instrument respectively sighted on three different objects;

FIG. 14A illustrates reading the indicia when the instrument is sighted on the chimney above the horizon;

FIG. 14B illustrates reading the indicia when the instrument is sighted on a point on the horizon between the tree and the building;

FIG. 14C illustrates reading the indicia when the instrument is sighted on the base of the tree below the horizon;

FIG. 16 is a diagram of an optical system embodying another form of optical sighting instrument in accordance with the invention, suitable for either nighttime or daytime use.

DETAILED DESCRIPTION

Figure 1:
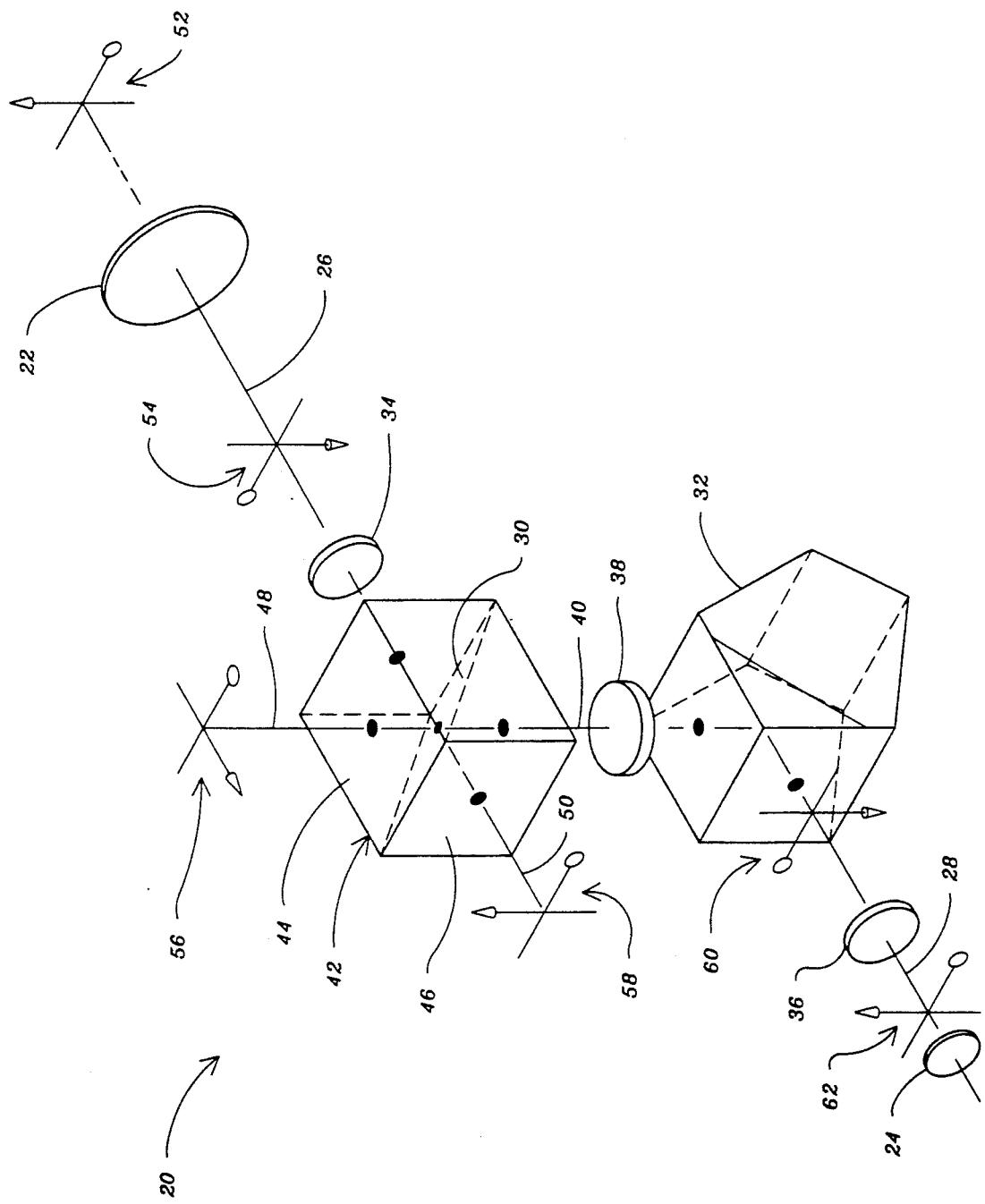
FIG. 1 is a generalized diagram of an optical system depicting various image planes and the orientations thereof.

Referring first to FIG. 1, a generalized optical system 20 has a main optical path including an objective lens 22 and an eyepiece lens 24. The main optical path is not straight but, rather, is displaced in that an axis 26 passing through the objective lens 22 does not coincide with an axis 28 passing through the eyepiece lens 24 due to the effect of reflecting surfaces including a beamsplitter 30 and a penta prism 32 which deviate the optical path by reflection. As is well known, such deviation of an optical path makes practical instruments more compact, without affecting the basic focusing effects of the various lenses.

Additional lenses depicted in FIG. 1 are an inverting lens 34 on the axis 26, an inverting lens 36 on the axis 28, and a relay lens 38 positioned along an intermediate axis 40 between the beamsplitter 30 and the penta prism 32. The relay lens 38 serves to maintain a short optical distance over a relatively longer physical distance.

The beamsplitter 30 is a diagonal plane beamsplitter and, preferably, is included within a beamsplitter cube 42 comprising a pair of right-angle prisms 44 and 46 cemented together, with the hypotenuse of one of the prisms 44 or 46 coated with a semi-reflecting coating before cementing. The semi-reflecting coating which comprises the actual beamsplitter 30 is sometimes referred to as a beamsplitter dielectric junction.

While the solid cube form of beamsplitter illustrated is preferred, it will be appreciated that other forms of beamsplitter may be employed. For example, a thin plate of glass having one surface coated with a semi-reflecting coating may be employed, but has the disadvantage of a displaced ghost image due to reflection from the second surface, as well as introducing astigmatism. As another example, a beamsplitter in the form of a pellicle may be employed, which is a thin membrane, usually a plastic, stretched over a frame. By virtue of the extreme thinness of a pellicle, ghost displacement and astigmatism may be reduced to acceptable values.

In any event, the diagonal plane beamsplitter has an orientation defined with reference to an optically hollow reference cube having four faces with normals lying in a single plane intersecting and perpendicular to the plane of the beamsplitter 30. The plane of the beamsplitter intersects diagonally opposite pairs of face edges separating respective pairs of the four faces. The optically hollow reference cube may comprise transparent material such as the physical beamsplitter cube 42 illustrated, or the optically hollow reference cube may simply be an air-filled region in space.

The beamsplitter 30 serves two functions. It separates one beam into two, and it combines two beams (or images) into one.

Thus, in FIG. 1 a beam or rays carrying an image pass through the objective lens 22 and travel along the optical axis 26 and reach the beamsplitter 30, whereupon the beam is split into two beams, one deviating upwardly along an axis 48 by reflection off the beamsplitter 30, and the other continuing straight along an axis 50 by transmission through the beamsplitter 30. In addition, beams or light rays traveling in the opposite directions along the axes 48 and 50, that is, down along the axis 48 and to the right along the axis 50, reach the beamsplitter 30 and are combined or superimposed to continue in a direction along the axis 40.

The penta prism 32 functions to deviate a light beam or line of sight by 90°, while neither inverting nor reversing an image. Light rays or beams enter the penta prism 32 along axis 40, and exit along axis 28.

An object plane and a number of image planes are defined within the optical system 20 of FIG. 1, with reference to the main optical path and the beamsplitter 30. Symbols are used in FIG. 1 to illustrate the orientation of images at the various image planes. Thus, at an object plane 52 the symbol represents the orientation of an object being viewed or sighted. It will be appreciated that FIG. 1 is not to scale in that the object represented by the symbol at the object plane 52 is at a relatively great distance from the objective lens 22. An image plane 54 is defined behind the objective lens 22, indicated by the position of the symbol. Two additional image planes 56 and 58 are positioned along the axes 48 and 50 as indicated. In the particular geometry of FIG. 1, and as described in greater detail hereinbelow, an image at the image plane 54 is split into images at the image planes 56 and 58, which image planes 56 and 58 are located the same optical distance from the beamsplitter 30. As a result, when viewed, all three are identical in size and orientation, which is important in preventing parallax.

In order for the main optical path to continue from the axis 26 through the beamsplitter 30 to the axis 40, at at least one of the image planes 56 and 58 there must be a reflecting surface. For example, if there is a reflecting surface at 56, then incoming light rays along the axis 26 are reflected from the beamsplitter 30 and deviated along the axis 48, to be reflected back down the axis 48 to pass through the beamsplitter 30 along the axis 40.

Additional image planes 60 and 62 are defined where indicated along the axis 28, images on the image plane 62 being viewed through the eyepiece lens 24.

In FIG. 1, it will be appreciated that images oriented as indicated at image planes 54, 56 and 58 are all superimposed for viewing through the eyepiece lens 24, as well as images of a distant object as the object plane 52. In use, the eyepiece lens 24 is adjusted to bring at least the three image planes at 54, 56 and 58 into focus, and the objective lens 22 is adjusted to bring the distant object into focus.

Referring now to FIG. 2, illustrated is one embodiment 70 of an optical sighting instrument in accordance with the invention, based on the generalized optical system 20 of FIG. 1. FIGS. 3A and 3B are two views of a compact housing 72 within which the FIG. 2 optical sighting instrument 70 may be enclosed for convenient use.

The instrument of FIG. 2 is more refined than the generalized diagram of FIG. 1, in that field lenses 74, 76 and 78 are added to prevent vignetting, and thus preserve a wide field of view. In addition, the single relay lens 38 of FIG. 1, in FIG. 2 is changed to a relay lens system comprising lenses 38' and 38".

Included in the FIG. 2 instrument are a pair of movable indicia elements respectively positioned in two of the image planes, and a fixed indicia element positioned in a third one of the image planes, such that images of all three of the indicia elements are superimposed for viewing through the eyepiece lens 24.

One of the movable indicia elements comprises a magnetic declination adjustment scale 80 which is adjustable in position laterally as indicated by arrow 82 by action of adjustment knob 84 connected to a lead screw 86. The other movable indicia element comprises a magnetic compass 88, having a surface with a spherical curvature. The fixed indicia element is designated 90, and serves as a sighting reference. The fixed indicia element includes a cross-hair sight 92, as well as an elevation scale 94.

In FIG. 2, at least one of the indicia elements at image planes 56 and 58 must be at least partially reflecting so that an image of a distance object may be viewed through the objective lens 22.

It will be appreciated that the particular positions of the movable and fixed indicia elements at the particular image planes may be varied, so long as all three images are optically superimposed for viewing. For example, the positions of the movable indicia element 80 and the fixed reference indicia element 90 may be switched, so long as the particular indicia element at the image plane 54 is either transparent or translucent.

Comparing the FIG. 2 instrument as thus far described to the instrument of my U.S. Pat. No. 4,763,419, both instruments include a beamsplitter such as the beamsplitter 30, a penta prism such as the penta prism 32, and a compass sphere such as the compass sphere 88 positioned at the image plane 58. A difference, however, is that in the instrument of the present invention, the declination adjustment scale 80 and the fixed indicia element 90 which serves as a sighting reference are separate. In the instrument of U.S. Pat. No. 4,763,419, a single cross-hair-type indicia element positioned at image plane 56 serves dual functions of a declination adjustment and of a sighting reference, with the attendant disadvantage that the sighting reference is not necessarily centered within the field of view. The instrument of my U.S. Pat. No. 4,763,419 does not include any indicia at all at the position of image plane 54.

Although three particular ones of the FIG. 1 image planes are employed in the embodiment of FIG. 2 as locations of indicia elements, it will be appreciated that there are other image planes at which the indicia elements may be located. For example, a fixed transparent or translucent indicia element may be located at either of the FIG. 1 image planes 60 or 62 behind the eyepiece lens 24.

In the particular arrangement of FIG. 2, the fixed indicia element 90 at image plane 54 comprises a transparent substrate with visible indicia thereon The movable reference indicia element 80 serving as a declination adjustment preferably comprises a mirrored surface with non-reflecting indicia thereon, the indicia indicated in FIG. 2 in dash lines to indicate they are on the underside of the declination adjustment element 80. The compass sphere 88 can comprise either a generally black or opaque sphere with reflecting indicia thereon or, alternatively, a generally reflecting sphere with non-reflecting or opaque indicia thereon. The latter arrangement, that is, with a generally reflecting sphere, results in a brighter image, but is more difficult to fabricate. Unless manufacturing is very precise, the image of the distant object reflected from the indicia element 88 will be slightly distorted, preventing perfect superimposition with the image reflected from the indicia element 80. Thus, it may be advantageous to employ a generally opaque compass sphere, with merely the indicia thereon being reflecting.

One of the features of the invention is that the relative intensities of the various images can be relatively varied in order to facilitate viewing under different conditions. Thus, included in the instrument 70 of FIG. 2 are a pair of polarizers adjustable in relative orientation. In FIG. 2, one of the polarizers is identified at 96, and is rotatable by means of adjustment knob 98 as indicated by arrow 100. The other polarizer comprises the beamsplitter 30. Beamsplitters are readily commercially available with a polarizing dielectric.

In the particular polarizer arrangement of FIG. 2, the intensity of the image of the compass 88 remains constant, while image intensities of the distant object viewed through the objective lens 22 and of the declination adjustment scale 80 are decreased by rotating the polarizer 96 relative to the polarizer comprising the beamsplitter dielectric 30. Intensity of the image of the object is varied since this image passes through the polarizer 96 to be reflected from the reflecting surface of the declination adjustment indicia element 80. As described hereinbelow with reference to FIG. 15, under some conditions it is desirable to decrease the intensity of the image of the object in order to relatively enhance the image of the compass sphere.

Although one particular polarizer arrangement is illustrated in FIG. 2, it will be appreciated that a number of variations may be employed. For example, if a non-polarizing beamsplitter is employed, various combinations of rotatable polarizer elements may be positioned, selective ones of all four of the sides of the beamsplitter cube, for a variety of selective effects, fixed and adjustable.

Figure 4B:
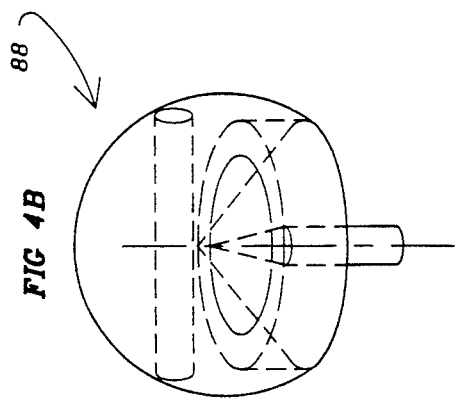
FIGS. 4A and 4B are exploded and assembled views respectively of the spherical compass element of the FIG. 2 instrument.
Figure 4A:
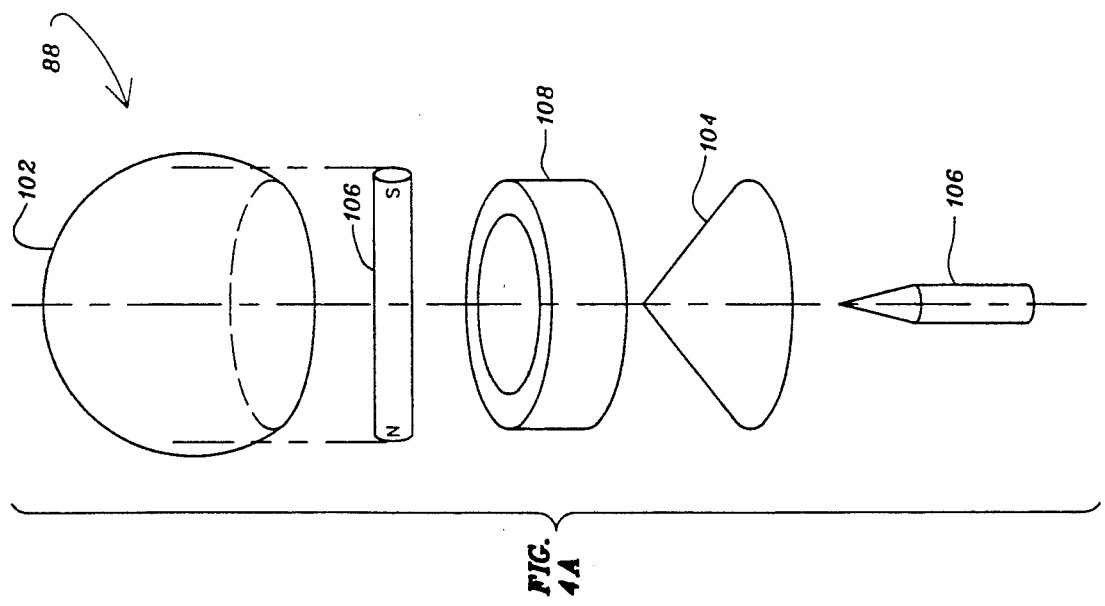

Referring now to FIGS. 4A and 4B, depicted are constructional details of the compass sphere 88 comprising one of the movable indicia elements. The compass sphere 88 comprises a generally spherical glass bulb 102, silvered on its inside surface, and sealed at the bottom by means of a combination support cone and sealing cap 104. Within the glass bulb 102 is a magnet 106 and an annular ballast element 108 of a non-magnetic material. The entire assembly rests on a pivot stem 106, which engages the underside of the tip of the sealing cap 104 to define a pivot point. It will be appreciated that the pivot point between the pivot stem 106 and the cone 104 must be located at the geometrical center of the compass sphere 88.

Figure 5:
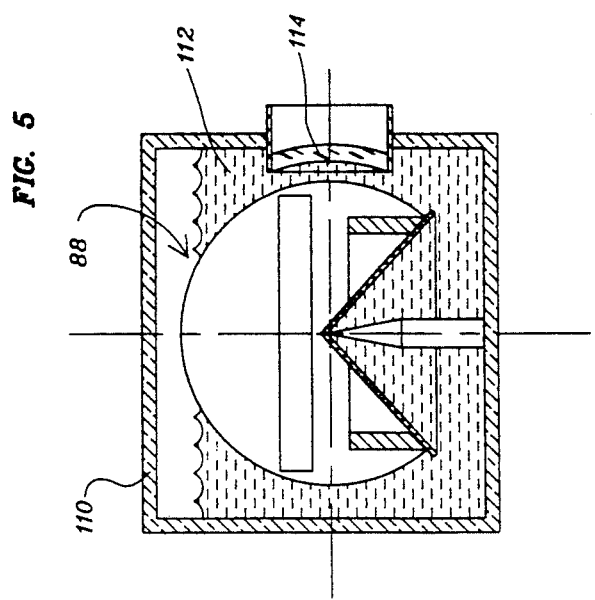
FIG. 5 is a cross-sectional view of the spherical compass element of FIGS. 4A and 4B supported within a compass housing.

FIG. 5 illustrates the manner in which the compass sphere 88 is mounted within a housing 110, surrounded by a damping liquid 112, such as kerosene. The ballast weight is adjusted so that the compass sphere 88 is nearly weightless when immersed in the kerosene, and the sealing cap 104 rests very lightly on the tip of the pivot stem 106.

The housing 110 in general may be either opaque or transparent However, for viewing indicia on the surface of the compass sphere 88, a transparent field-flattener lens 114 is employed, the characteristics of which are described next with reference to FIGS. 6, 7 and 8.

FIG. 6 depicts the manner in which the field-flattener lens 114 in effect reconfigures or converts a spherical wave front represented at 116 to a flat or planar wave front 118. In the arrangement depicted in FIG. 6, a region to the right of the field-flattener lens 116 comprises air, and has an index of refraction $n_1 = 1.00$. The region to the left of the field-flattener lens 114 comprises kerosene, and has an index of refraction $n_2 = 1.45$. In addition, the lens 114 itself is made of a material such as "plexiglass" which has an index of refraction substantially identical to that of the liquid such that, optically, there is no interface between the field-flattener lens 114 and the liquid. For purposes of calculation, the spherical wave front represented at 116 is treated as diverging from a point source 120 located at the center of the compass sphere 88, and a distance $f_1$ from the outer edge of the lens 114, which outer edge represents the actual optical interface between a region of index of refraction $n_2$ and a region of index of refraction $n_1$.

Strictly speaking, the field-flattener lens 114 should be elliptical in cross-section. However, as a practical matter, a semi-spherical lens can be employed, provided the angular range of the light cone defined emanating from the point 120 remains relatively narrow.

For determining the dimensions, the following formula may be employed:

$$f_1 = \frac{n_2}{n_2 - n_1} R$$

where R is the radius of curvature of the field-flattener lens 114.

FIGS. 7 and 8 together depict the effect of the field-flattener lens FIG. 7 depicts the spherical curvature of the compass sphere 88 in isolation. For normal viewing when the instrument is in use, the degree reference numerals on the compass sphere 88 are reversed in mirror image, and these numerals appear normally when viewed through the instrument as will be apparent from the optical arrangements of FIGS. 1 and 2. Also visible on the compass sphere 88 are meridians or longitude lines 122 spaced every 10°, and a single equator or artificial horizon reference line 124. As stated hereinabove, the surface of the compass sphere 88 may be generally black with the indicia comprising the numerals and the lines 122 and 124 may be mirrored. Alternatively, the compass sphere 88 may be generally mirrored, and the lines 122 and 124 and the numerals be black.

FIG. 8 illustrates the surface of the compass sphere 88 as viewed through the field-flattener lens 114. With correctly designed optics, the spherical surface is made to appear flat.

To better illustrate operation of the FIG. 2 instrument 70, FIGS. 9A through 9D illustrate the contributions of the various images and indicia elements as viewed through the eyepiece lens 24.

Figure 9C:
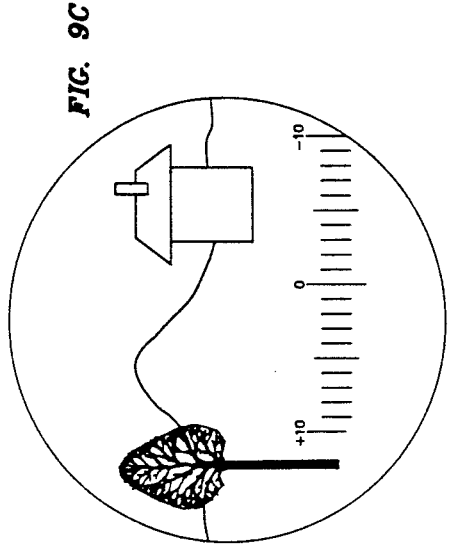
FIG. 9C is a simulated view which adds to the FIG. 9A view a superimposed image of the movable indicia element comprising the magnetic declination adjustment.
Figure 9D:
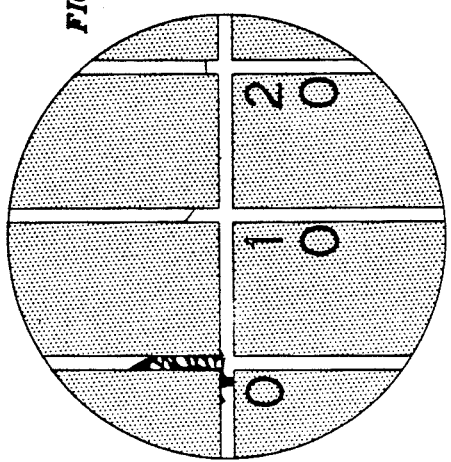
FIG. 9D is a simulated view through the FIG. 2 instrument depicting an image of the movable indicia element comprising reflecting indicia on the magnetic compass, with portions of the distant objects reflected in the indicia.
Figure 9E:
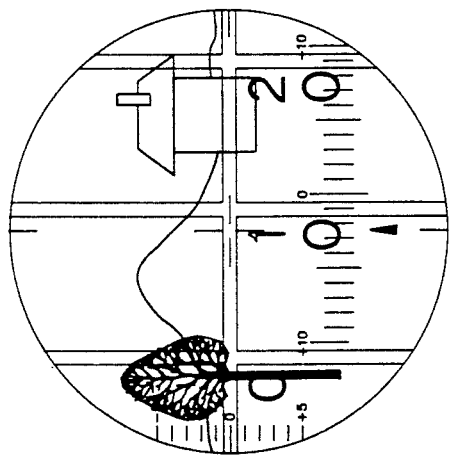
FIG. 9E depicts an actual view through the FIG. 2 instrument, with images of all indicia elements superimposed on an image of the distant objects.
Figure 9A:
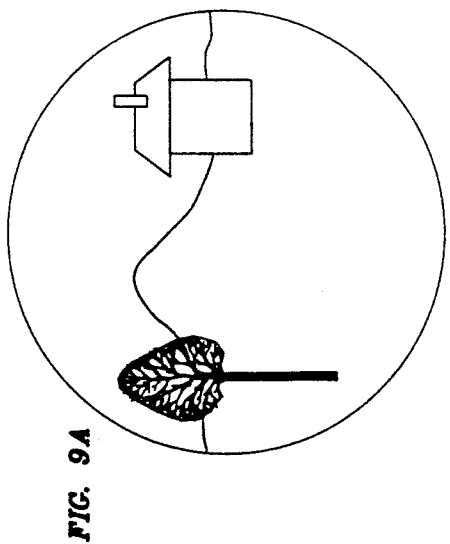
FIG. 9A is a simulated view through the FIG. 2 instrument depicting distant objects as they would appear without any superimposed indicia images.

FIG. 9A is a simulated view through the instrument, eliminating all indices for purposes of illustration, showing only the distant objects or scene to be sighted.

Figure 9B:
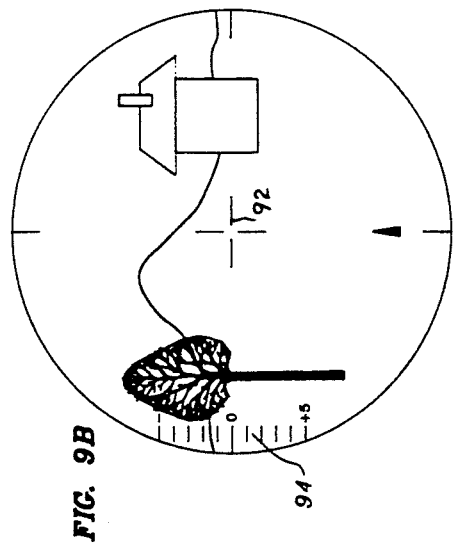
FIG. 9B is a simulated view which adds to the FIG. 9A view a superimposed image of the fixed indicia element serving as a sighting reference.

FIG. 9B adds to the simulated view of FIG. 9A the contribution of the fixed indicia element 90 located at image plane 54, including the cross-hair sight 92 and the elevation scale 94. It is a feature of the invention that the cross-hair sight 92 remains centered in the field of view at all times.

FIG. 9C is a similar simulated view, which adds to the view of FIG. 9A an image of the declination adjustment element 80 located at the image plane 56. As may be seen in FIG. 9C, the declination adjustment scale is shifted to the right, since the instrument is set for a non-zero declination. It will be appreciated that the entire distant object image as viewed in FIG. 9C is reflected from the surface of the indicia element 80, and the visible scale lines are opaque.

FIG. 9D is a simulated view through the instrument showing only the compass sphere 88 as viewed through the field-flattener lens 114. The background in FIG. 9D is generally black or opaque. However, portions of the distant image are reflected in the reflecting indicia on the surface of the compass sphere 88.

Finally, FIG. 9E depicts an actual view through the FIG. 2 instrument, with images of all three indicia elements described individually above with reference to FIGS. 9B, 9C and 9D superimposed. It may be noted that the image portion sighted in FIG. 9E is located at an 11° heading referenced to true north. The manner in which the instrument is read is described in detail hereinbelow with reference to FIGS. 13, 14A, 14B and 14C.

FIGS. 10A, 10B, 11A, 11B, 12A and 12B represent in exaggerated form the variation between true north and magnetic north at various geographic locations, and the corresponding adjustment of the declination indicia element 80. In each of FIGS. 10A, 11A and 12A, the position of magnetic north is represented as a point 130. An observer's position is represented by points 132, 134 and 136 respectively in the three figures.

Figure 10A:
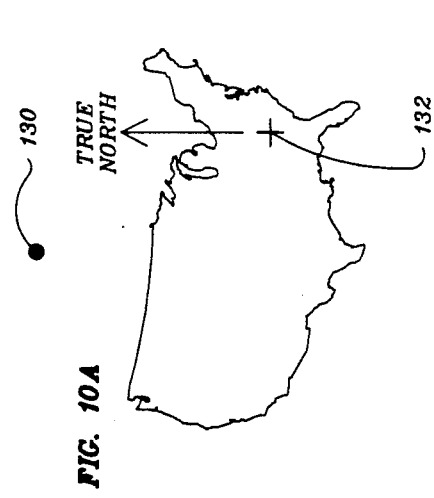
FIG. 10A is a representation of a geographical location where magnetic declination is westerly.
Figure 10B:
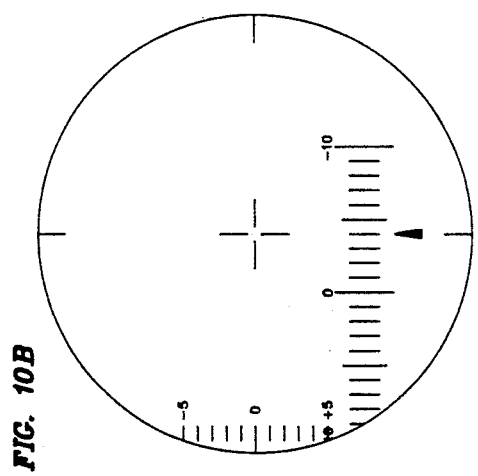
FIG. 10B depicts a corresponding adjustment of the magnetic declination indicia of the FIG. 2 instrument.

In FIG. 10A, magnetic north 130 is to the west of true north from the observer's point 132, and magnetic declination is said to be westerly. FIG. 10B illustrates a corresponding adjustment of the declination scale for a 4° westerly (or negative) declination.

Figure 11A:
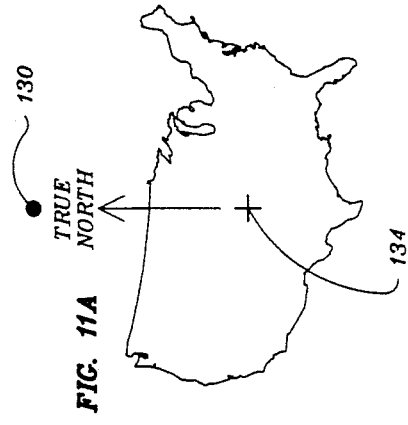
FIG. 11A is a representation of a geographical location where there is no magnetic declination.
Figure 11B:
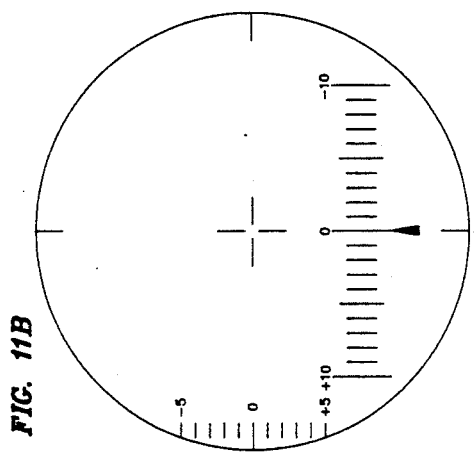
FIG. 11B depicts a corresponding adjustment of the magnetic declination indicia of the FIG. 2 instrument.

FIG. 11A illustrates the situation where true north and magnetic north are exactly in alignment, and there is no magnetic variation or declination. Thus, the corresponding adjustment in FIG. 11B is for zero magnetic declination.

Figure 12A:
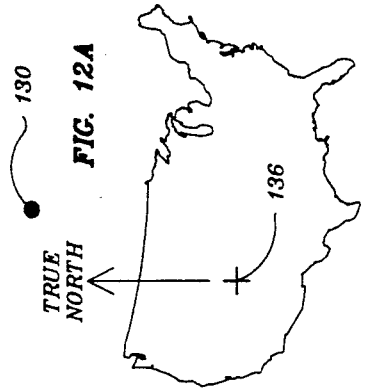
FIG. 12A is a representation of a geographical location where magnetic declination is easterly.
Figure 12B:
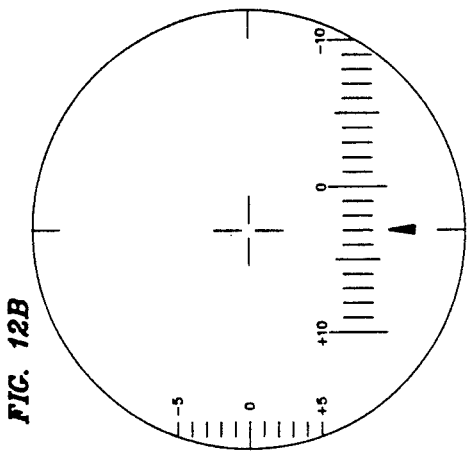
FIG. 12B depicts a corresponding adjustment of the magnetic declination indicia of the FIG. 2 instrument.

Finally, FIG. 12A illustrates the situation where magnetic north 130 is to the east of the observer's position 136. FIG. 12B correspondingly illustrates the declination adjustment for 3° easterly (or positive) magnetic declination.

FIGS. 13, 14A, 14B and 14C together depict the manner in which the instrument of the invention is read. For purposes of illustration, in FIG. 13 the instrument 72 is shown alternatively directed along three different sight lines 140, 142 and 144 respectively to a point 146 at the top of the chimney, a point 148 on the horizon, and a point 150 at the base of the tree below the horizon.

FIG. 14A corresponds to a view along sight line 140 in FIG. 13, where the cross-hair sight is centered on the chimney point 146. To read the sighted direction with reference to true north, the intersection with the declination adjustment scale 80 of any one of the visible meridian lines 122 on the compass sphere spaced every 10° is noted. In FIG. 14A, it is convenient to observe that the 20° line on the compass scale intersects the declination scale at $-4\frac{1}{2}°$. The actual direction with reference to true north is then read as $20°-4\frac{1}{2}°=15\frac{1}{2}°$. Equivalently, it can be observed that the 10° compass line intersects the declination scale at $+5\frac{1}{2}°$. The direction is then read as $10°+5\frac{1}{2}°=15\frac{1}{2}°$. The elevation of the chimney point 146 is approximately 7° above the horizon, as indicated by the intersection of the artificial horizon 124 with the elevation scale 94 to the left.

FIG. 14B is a view through the instrument when sighted along FIG. 13 line 142 to the horizon point 148. In FIG. 14B, the direction referenced to true north may likewise be read in two equivalent alternative manners. The 10° compass longitude line 122 intersects the declination scale at $-4°$. The reading is then $10°-4°=6°$. Alternatively, the instrument may be viewed as the 0° compass line intersecting the declination scale at $+6$. The reading is then $0°+6°=6°$. Since the point 148 is exactly on the horizon, the elevation angle in FIG. 14B is exactly zero.

FIG. 14C is a view along sight line 144 to point 150 at the base of the tree. Here the direction may be read as the intersection of the 350° compass line with the declination scale at approximately $+6\frac{1}{2}°$ for a heading of $350°+6\frac{1}{2}°=356\frac{1}{2}°$. Alternatively, the 0° compass line intersects the declination scale at $-3\frac{1}{2}°$. Since a 0° heading is the same as 360°, this particular reading can be interpreted as $360°-3\frac{1}{2}°=356\frac{1}{2}°$. Elevation of the base of the tree in FIG. 14C is approximately 7° below the horizon.

Figure 15:
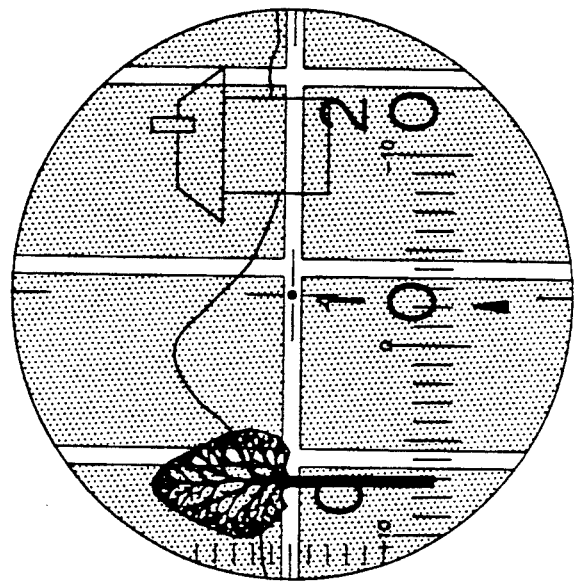
FIG. 15, which may be contrasted with FIG. 14B, illustrates the action of the adjustable polarizers to enhance the compass indicia image by reducing the intensity of the object images.

FIG. 15, which may be contrasted with FIG. 14B, illustrates the effect of the FIG. 2 polarizer 96. In particular, FIG. 15 illustrates the effect when the polarizer 96 is adjusted relative to the polarizing beamsplitter 30 to attenuate the image of the distant object as well as the image of the declination adjustment scale 80. In FIG. 15, all parts of the composite image are diminished in intensity, with the exception of the lines and indicia on the compass scale.

FIG. 16 is a diagram of another embodiment of an optical sighting instrument 170 in accordance with the invention, suitable for either nighttime or daytime use. As in FIGS. 1 and 2, in the embodiment of FIG. 16 a main optical path includes the objective lens 22 and the eyepiece lens 24, and the beamsplitter 30 is positioned within the main optical path. In FIG. 16, image planes are defined at 172, 174 and 176, and all three are optically superimposed.

The embodiment of FIG. 16 differs from that of FIG. 2 in that an additional penta prism 178 is included, which serves to deviate an incoming image along an optical axis 180 down along optical axis 182 through the movable declination adjustment 80, which in this case comprises a transparent substrate with indicia supported thereon.

For illuminating at least the compass sphere 88, a means for illuminating, generally designated 184, is provided. The illuminating means comprises, for example, a lamp 186 with a series-connected battery 188 and push-button switch 190 for energizing the lamp 186. The lamp 186 is positioned with reference to the beamsplitter 30 such that illumination from the lamp 186 passes along an axis 192 and is transmitted through the beamsplitter 30 to illuminate the compass sphere 88. However, while an image of the illuminated compass sphere 88 may be viewed through the eyepiece lens 24, after being reflected by the beamsplitter 30 and penta prism 32, light from the lamp 186 is not directed through the eyepiece lens 24. As another feature of this arrangement, illumination light from the lamp 186 is reflected from the beamsplitter 30 up to the penta prism 178, and then out through the objective lens 22. Under some nighttime viewing conditions, a spot of light may be directed onto nearby objects for reference purposes.

Although illustrated as a lamp 186, alternatively the illuminating means 184 may comprise a suitable window for allowing ambient light to enter the housing 72, preferably through a diffuser.

Another feature of illuminating light being directed through the declination adjustment scale 80 and the fixed sighting reference 90 is that the indicia thereon may be formed by lightly etching or "frosting" the substrate, and such indicia become visible when illuminated.

Polarizers for varying relative image intensity may readily be applied to the FIG. 16 embodiment as well. As one example, an adjustable polarizer 194 is positioned between the beamsplitter 30 and the compass sphere 88, which cooperates with the polarizing beamsplitter 30 to selectively decrease illumination light and intensity of the image of the compass sphere 88. This is a particularly beneficial feature for nighttime use since the intensity of the compass sphere image can be adjusted to the minimum visible value, while preserving the image intensity of the distant object. As in the previous embodiments, although one particular polarizer position is illustrated in FIG. 16, it will be appreciated that a variety of other polarizer positions may be employed. Similarly, an additional separate polarizer may be provided, rather than employing a polarizing beamsplitter 30.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. An optical sighting instrument comprising:
   a main optical path including an objective lens and an eyepiece lens;
   a beamsplitter positioned within said main optical path;
   at least three image planes being defined with reference to said main optical path and said beamsplitter, at least one of said image planes being optically superimposed with the others of said image planes by said beamsplitter; and
   a pair of moveable indicia elements respectively positioned in two of said image planes, and a fixed indicia element positioned in the third of said image planes such that images of all three of said indicia elements are superimposed for viewing through said eyepiece lens, the image of said fixed indicia element serving as a sighting reference.

2. An optical sighting instrument in accordance with claim 1, wherein one of said moveable indicia elements comprises a magnetic compass and the other of said moveable indicia elements comprises a magnetic declination adjustment.

3. An optical sighting instrument in accordance with claim 2, wherein said fixed indicia element comprises a crosshair sight.

4. An optical sighting instrument in accordance with claim 1, wherein:
   at least one of said indicia elements comprises a reflecting surface with non-reflecting indicia thereon; and
   said main optical path is deviated 180° by reflection by said at least one of said indicia elements.

5. An optical sighting instrument in accordance with claim 1, wherein:
   at least one of said indicia elements comprises a substrate supporting visible indicia thereon; and
   said main optical path passes through said at least one of said indicia elements.

6. An optical sighting instrument in accordance with claim 1, wherein:
   two of said indicia elements comprise reflecting surfaces;
   said main optical path is separated by said beamsplitter into two portions which are each deviated 180° by reflection from respective ones of said two indicia elements and then recombined by said beamsplitter;
   a third one of said indicia elements comprises a substrate supporting visible indicia thereon; and
   said main optical path passes through said third one of said indicia elements.

7. An optical sighting instrument in accordance with claim 6, wherein said third one of said indicia elements comprises said fixed indicia element.

8. An optical sighting instrument in accordance with claim 1, wherein at least one of said indicia elements comprises a non-reflecting surface with reflecting indicia thereon.

9. An optical sighting instrument in accordance with claim 8, which further comprises means for illuminating said at least one of said indicia elements through said beamsplitter, said means for illuminating positioned with reference to said beamsplitter such that illumination light is not directed to said eyepiece lens.

10. An optical sighting instrument in accordance with claim 9, wherein said means for illuminating is positioned with reference to said beamsplitter such that illumination light is directed out through said objective lens.

11. An optical sighting instrument in accordance with claim 8, said at least one of said indicia elements with reflecting indicia comprises a magnetic compass.

12. An optical sighting instrument comprising:
    a main optical path including an objective lens and an eyepiece lens;
    a beamsplitter positioned within said main optical path;
    at least three image planes being defined with reference to said main optical path and said beamsplitter, at least one of said image planes being optically superimposed with the others of said image planes by said beamsplitter;

a pair of moveable indicia elements respectively positioned in two of said image planes, and a fixed indicia element positioned in the third of said image planes such that images of all three of said indicia elements are superimposed for viewing through said eyepiece lens, the image of said fixed indicia element serving as a sighting reference; and a pair of polarizers adjustable in relative orientation and positioned for varying the intensity of an object image viewed through said main optical path.

13. An optical sighting instrument in accordance with claim 12, wherein one of said polarizers comprises said beamsplitter.

14. An optical sighting instrument comprising:

a main optical path including an objective lens and an eyepiece lens;

a beamsplitter positioned within said main optical path;

at least three image planes being defined with reference to said main optical path and said beamsplitter, at least one of said image planes being optically superimposed with the others of said image planes by said beamsplitter;

a pair of moveable indicia elements respectively positioned in two of said image planes, and a fixed indicia element positioned in the third of said image planes such that images of all three of said indicia elements are superimposed for viewing through said eyepiece lens, the image of said fixed indicia element serving as a sighting reference; and a pair of polarizers adjustable in relative orientation and positioned for varying the intensity of the image of one of said indicia elements.

15. An optical sighting instrument in accordance with claim 13, wherein one of said polarizers comprises said beamsplitter.

16. An optical sighting instrument comprising:

a main optical path including an objective lens and an eyepiece lens;

a beamsplitter positioned within said main optical path;

at least three image planes being defined with reference to said main optical path and said beamsplitter, at least one of said image planes being optically superimposed with the others of said image planes by said beamsplitter;

a pair of moveable indicia elements respectively positioned in two of said image planes, and a fixed indicia element positioned in the third of said image planes such that images of all three of said indicia elements are superimposed for viewing through said eyepiece lens, the image of said fixed indicia element serving as a sighting reference, one of said moveable indicia elements comprising a magnetic compass which comprises a surface having a spherical curvature, and the other of said movable indicia elements comprising a magnetic declination adjustment; and a field flattener lens positioned in front of said magnetic compass surface so as to make the surface having a spherical curvature appear as a flat surface.

17. An optical sighting instrument in accordance with claim 16, wherein said magnetic compass is supported within a chamber including a liquid having a particular index of refraction, and said field flattener lens is made of a material having a substantially identical index of refraction.

* * * * *